INVENTOR
BORIS ABEL AMIRAGOFF
By Young + Thompson
ATTYS.

INVENTOR
BORIS ABEL AMIRAGOFF
BY Young & Thompson
ATTYS.

United States Patent Office 3,448,261
Patented June 3, 1969

3,448,261
SIGNAL DETECTION AND MEASURING CIRCUIT
Boris Abel Amiragoff, 21 Rue Vilain XIV,
Brussels, Belgium
Filed Mar. 4, 1966, Ser. No. 531,939
Claims priority, application Luxembourg, Mar. 11, 1965,
48,167; Feb. 4, 1966, 50,399
Int. Cl. G01n *21/26, 23/12;* H01j *37/00*
U.S. Cl. 250—43.5                                                                           4 Claims

ABSTRACT OF THE DISCLOSURE

An apparatus for detecting and measuring signals derived from the ionization of a gaseous medium wherein the reference element comprises an ionization chamber which is provided with two electrodes and an ionizing source, the interior of said chamber being in direct connection with the ambient medium, said chamber being adapted to operate in the region of its response characteristic where the recombination rate of the gas ions is high such that the variation of the internal resistance thereof depends substantially only on the gas pressure variations.

---

Figure 1:
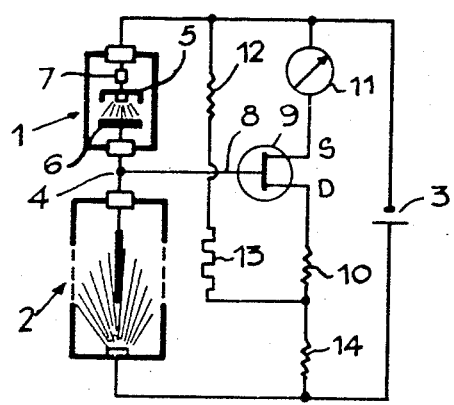

The present invention relates to a circuit intended for detecting and measuring signals derived from the ionisation of a medium, more particularly a gaseous medium.

The industrial requirements for monitoring, analysis and safety in the production and handling of compressed or liquefied gases in the petroleum or petrochemical industry have largely contributed, in the course of recent years, to the appearance of apparatus for detecting and measuring concentrations or degrees of purity of gases, vapours or fumes.

However, the diversity and complexity of the methods employed have been such that it has been very difficult to monitor continuously and automatically characteristics or parameters which govern the physical conditions in gaseous media.

It was only at the beginning of the 1930–1940 decade that a possible solution to the problem of continuous metrology in the gas phase was outlined.

The basis of the process, in this instance the measurement of electric currents resulting from the ionisation of a simple or composite atmosphere by the alpha-particle of radium, formed the subject of a Belgium Patent No. 393,134, granted Jan. 31, 1933 to the French physicist P. Malsallez, who perfected his method in collaboration with L. Breitmann and published in the Revue Générale de l'Electricité of Feb. 26, 1938 (vol. XLIII, pp. 279–284) a very detailed description of his work.

The method consisted in associating two ionisation chambers with a thermionic valve, of which the control grid was connected to the common point between the two chambers. These two chambers were of identical dimensions, but one of them was hermetic—and served as a fixed reference element—while the other was open to the free circulation of the ambient gaseous medium. Any variation occurring in the constitution of this medium, or any change in the pressure in the open chamber, resulted in a variation of the current initially flowing through the two chambers, so that the resultant variations of the voltage set up at the grid of the thermionic valve afforded a means of detecting the change which had occurred.

However, this method has the disadvantage that it requires a current for warming up the heater of the valve which, in a system intended to operate in a continuous cycle, involves the presence of a source of continuous supply which source, in addition, must be carefully stabilised. The method is also affected by the changes of the electric parameters of the electron tube resulting from the progressive exhaustion of the cathode in time. If there are added to this the specific instabilities of thermionic valves due to the random nature of the cathode emission, the lack of industrial success of the process will be understood.

Another apparatus, forming the subject of German Patent No. 1,079,351, of Feb. 24, 1958, also uses the aforesaid method, but comprises a cold-cathode tube or cold cathode thyratron in place of the thermionic valve, with a relay inserted in the anode circuit of the thyratron. This device obviates the aforesaid disadvantages, but on the other hand has the following defects:

(1) The circuit operates on an "on-off" basis, and therefore cannot be used in continuous metrology.

(2) Cold cathode thyratrons and other similar tubes require for their operation high voltages generally between 250 and 350 volts.

(3) The initiation of the flow of current between the cathode and the anode of the cold cathode thyratron requires that the control electrode of the latter be subjected to potential variations of several tens of volts, which assumes ionisation chambers of relatively great volume containing relatively high charges of radioactive substances.

(4) The cold cathode thyratron may be externally struck (Geiger effect) by impacts of cosmic radiations which thus involve untimely actions.

(5) Periodic replacement of the cold-cathode tube is necessary by reason of the variations of its characteristics.

Now, the practical requirements make it necessary for detecting apparatus intended for continuous monitoring to have very high criteria of sensitivity, reliability and stability while at the same time ensuring the continuous presence of a stand-by current effecting the automatic monitoring of the installations, which it is not possible to obtain by the use of cold-cathode tubes.

Moreover, international regulations severely limit the activity of ionising sources, which makes it necessary to employ chambers of small volume excited by very weak radioactive sources.

The present invention obviates the disadvantages or limitations inherent in the earlier systems by completely satisfying the above-mentioned criteria, and provides a detecting and measuring apparatus with equal reliability and sensitivity in all its elements, with the further advantage that it operates at low voltage.

The invention provides an apparatus for the detection and measurement of signals, notably of signals derived from the ionization of a medium, more particularly of a gaseous medium, comprising a first ionisation chamber, open to the ambient medium, and connected as a potentiometric divider with a second ionisation chamber supplying a reference potential, the combination of the two chambers thus connected supplying a differential signal which is applied to the control electrode (grid) of a field-effect semiconductor which has no heated element and which in itself is of very small volume, and has very high reliability in time and a very considerable linear operating region, and which does not require periodic replacement, as do vacuum or cold-cathode tubes.

The use of the field-effect semiconductor in place of the previously known elements constitutes a first fundamental feature of the invention, which ensures, in addition to the aforesaid advantages, very high sensitivity, brings about a very considerable reduction of the activity of the ionising sources, of the volume of the ionisation chambers and of the whole apparatus, and provides a standby current which can be used for the automatic monitoring both of the detectors themselves and of the installations comprising them, in accordance with the existing regulations in this field.

Moreover, owing to the very considerable reduction of the activity of the ionising radioactive sources which can thus be obtained, the international regulations (Euratom Feb. 19, 1959) can be readily observed.

The combination of the advantages resulting from the employment of the apparatus according to the present invention cannot be obtained by the other means at present known.

In accordance with one embodiment of the invention, the ionisation chamber which supplies the reference potential consists of two parallel discs of relatively small dimensions, the distance between which is adjustable by a coaxial movement of one of the discs, and one of which carries a small radioactive charge.

In accordance with a preferred embodiment of the invention, the ionisation chamber which supplies the reference potential is also open to the ambient medium and consists of an ionisation chamber having a very high recombination rate, the spacing between the two parallel discs being so adjusted that the variation of the internal resistance of this ionisation chamber applies a correction to the variation of the internal resistance of the other ionisation chamber, under the influence of external physical agents.

In accordance with the adjustment of the spacing, this correction may effect a partial or absolute compensation or even an over-compensation of the effects of the external disturbing agents.

It is obvious that the apparatus according to the invention may be associated with input circuits or elements and output circuits of very varied nature.

Further features and advantages of the invention will become apparent from the following description and on consideration of the drawings accompanying the present specification, in which:

FIGURE 1 illustrates the basic circuit of the invention.

Figure 2:
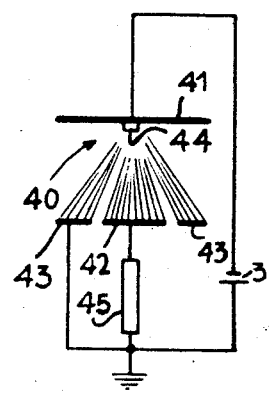
Figure 4:
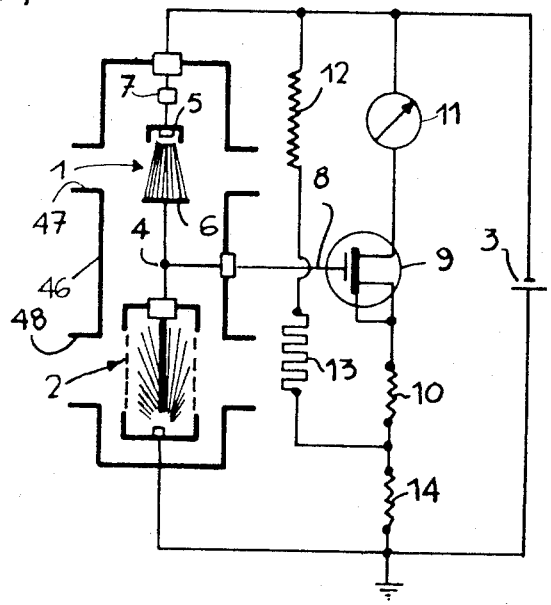

FIGURE 2 diagrammatically illustrates an apparatus which will enable the principle of the preferred arrangement of FIGURE 4 to be understood.

Figure 3:
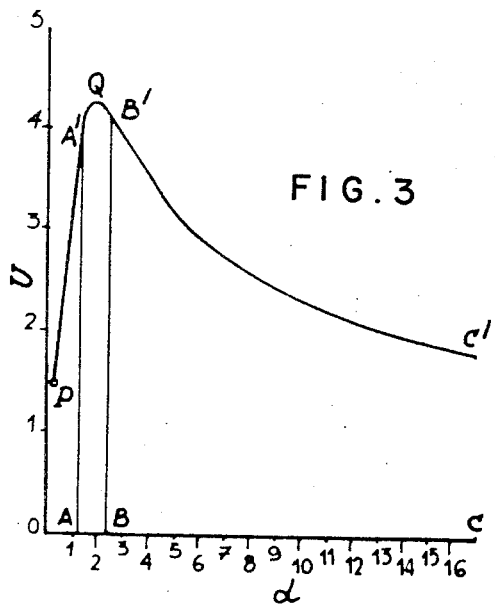

FIGURE 3 is a measurement curve obtained by the arrangement of FIGURE 2.

FIGURE 4 diagrammatically illustrates the arrangement of the ionisation chambers in accordance with a preferred embodiment of the invention.

Figure 6:
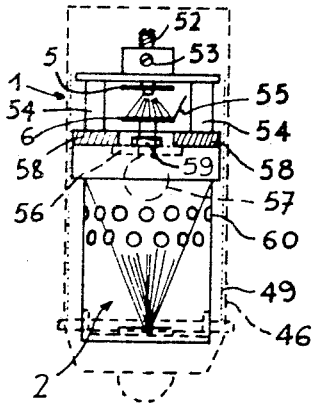
Figure 5:
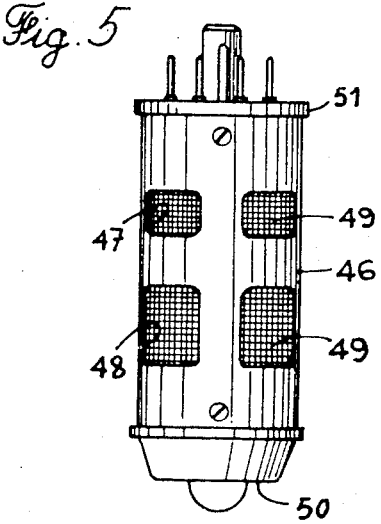

FIGURES 5 and 6 are an external view and an internal view of the apparatus arranged in accordance with FIGURE 4.

In the figures, like elements are denoted by the same numerals.

FIGURE 1 illustrates the basic circuit of the apparatus according to the invention. Two ionisation chambers 1 and 2 are connected to form a potentiometric divider in known manner to a supply source 3 having negligible internal resistance and affording a stable potential difference V. The common point 4 between the two chambers is connected to the control grid 8 of a field-effect transistor 9, the "drain" electrode circuit of which contains the resistance 10, and the "source" electrode of which contains a measuring instrument 11.

The chamber 1 has a very small effective volume—several cubic millimetres—while the volume of the chamber 2 is relatively larger—several cubic centimetres.

The chamber 1 is characterised by two parallel discs 5 and 6 of very small dimensions, the distance between which is adjustable by coaxial movement of one of the discs in relation to the other and locking by means of a screw 7. The thickness of the layer of ionised air in the space between the two electrodes being adjustable, it constitutes a variable resistance of high value by means of which it is possible to fix the potential of the point 4. This chamber is hermetic, so as to be protected from the influence of the ambient medium.

The chamber 2 is of conventional form, being of the cylindrical type comprising a central electrode, and is surrounded by a wall formed with perforations which are such that the interior of 2 is subjected to all the fluctuations of the ambient medium.

The field-effect transistor as employed at 9 is a relatively recent semiconductor having the fundamental property—which is particularly useful in the circuit under consideration—of exhibiting a very high input impedance ($10^{13}$ to $10^{15}$ ohms) due to the fact that the latter consists either of a back-biased junction or of a "grid" strongly isolated by a layer of silicon dioxide ($SiO_2$) from the semiconductor body of the element. Various types of field-effect semiconductors are known, such as "Truc" (field-effect unipolar transistor), "Tecnetron" or "Statistor." In the present specification, except where otherwise indicated, no account will be taken of the type of field-effect transistor employed, because the operation of the circuit, its high sensitivity and its extreme reliability are independent of the specific parameters of the type of field-effect semiconductor chosen.

The circuit of FIGURE 1 operates as follows:

By adjustment of the distance $d$ between the discs 5 and 6 in the calm open air, the grid 8 of the semiconductor 9 is brought to a potential defined by the ratio of the internal resistances of the chambers 1 and 2. This potential is so fixed as to operate the field-effect transistor at the middle of the linear portion of its characteristic curve.

Under these conditions, the instrument 11 measures the current flowing through the "source" circuit of 9. Any variation affecting the medium contained in the chamber 2 will result in a variation of the potential at the point 4 and consequently a variation of the current of the transistor, measured at 11.

The strength of the current measured at 11 increases if the pressure or density of the ambient medium increases, and it decreases if the pressure or density of the ambient medium decreases.

The resistors 12 and 14 form with a negative-temperature-coefficient resistor 13 (NTC or thermistor) a network compensating for the specific variations of the field-effect transistor as a function of the temperature.

Provided that its resistance is appropriately adapted to the circuit, the load, represented by the resistance 10, may consist of an alarm circuit, a wire or wire-less remote-control circuit or finally any electric load in general which is required by the user.

The load resistance 10 shown in FIGURE 1 in the "drain" circuit of the semiconductor could alternatively be inserted in the "source" circuit without altering the operation of the system. The measuring instrument 11 may be, for example, a galvanometer, a contact galvanometer or a relay actuating any automatic device in general.

The apparatus as described in the foregoing largely satisfies the conditions referred to in the introduction to the description. It renders possible working with the aid of low-voltage sources, it contains no element which is subject to ageing and it is therefore always reliable. On the other hand, it enables a stand-by current to be provided. Finally, it is of very high sensitivity. However, regardless of the usefulness of the aforesaid embodiment, it is still subject to one imperfection, since the signal applied to the grid of the field-effect transistor remains affected by disturbing influences which are not eliminated by the differential arrangement consisting of the potentiometric divider.

In this arrangement, the reference resistance, consisting of the hermetic chamber, is not subject to the considerable disturbing influences, the main one of which is the pressure variation undergone by the ionised medium. Only the open chamber is sensitive thereto.

In order to obviate this disadvantage, it is proposed in accordance with a development of the idea of the invention also to open the reference chamber to these external influences.

The disturbing influences are thus eliminated by subtraction, but what is true of the disturbing agents is also true of any other agent which simultaneously acts on the two chambers, so that in the presence of gases, vapours or fumes, such an apparatus would supply no response, since the voltage across the terminals of the active element 2 would remain constant. Therefore, the current variations affecting the chamber 1 must be differentiated from the current variations affecting the chamber 2. In accordance with the invention, this is achieved by giving the reference chamber the form of a chamber having a high recombination rate.

In order that the electrical behaviour of the process employed may be understood, the very simple arrangement illustrated in FIGURE 2 will be considered.

In this circuit, 40 is an ionisation chamber comprising parallel discs, which is chosen here merely for the sake of explanation and has no limiting character. A circular metal disc 41 comprising at its center an ionising source 44 of several microcuries of an alpha-particle emitter is parallel and coaxial with a second disc 42 of like nature, which is surrounded by a metal guard ring 43, which is grounded and defines the active volume of 40.

The disc 42 is fixed and carefully insulated from 43 and from ground. The distance $d$ between 41 and 42 can be varied by coaxial movement of 41 in relation to 42.

A fixed and stable load resistance 45 of very high value ($10^{10}$ ohms for example) is inserted between 42 and ground while the whole arrangement is connected to a source 3, across the terminals of which there exists an absolutely stable potential difference V.

The positive pole of 3 is connected to 42, while the negative pole is connected to the common ground of the circuit.

With this arrangement, as a result of the ionising action of the source 44, the resistance 45 is traversed by a current such as:

$$I_c = \frac{V}{R_{40} + R_{45}}$$

in which $R_{40}$ is the apparent internal resistance of 40 under given physical conditions and $R_{45}$ is the value of the resistance 45.

Thus, there exists across the terminals of the resistance 45 a potential difference $$U = I_c R_{45} = \frac{V R_{45}}{R_{40} + R_{45}}$$

which is determined essentially by the variations of the internal resistance $R_{40}$ of the chamber 40.

If, starting with a very small distance $d$ (for example a tenth of a millimetre) between the discs 41 and 42 at constant temperature, barometric pressure and humidity, $d$ is gradually increased and the values of U corresponding to each value of $d$ are successively measured, there is obtained the curve reproduced in FIGURE 3, in which the distance $d$ (in millimetres) has been plotted along the abscissae and the voltage U (expressed in volts) across the terminals of the resistance 45 have been plotted along the ordinates.

The particular form of the curve of FIGURE 3 is due mainly to the incidence of various phenomena.

Between P and Q, the rising form is due to the following factors:

(a) When $d$ increases, the electrostatic capacitance between the discs 41 and 42 decreases, so that with a given load the voltage across the terminals of the capacitor also increases.

(b) When $d$ increases, the paths traversed by the ionising particles increase and the specific ionisation and the number of pairs of ions formed thus also increase.

(c) When $d$ increases, the electrostatic field between the electrodes decreases. This results in an initial loss by recombination of the ions and the voltage increases due to the reduction of capacitance between the electrodes increase at a lower rate, since the successive relative increases of $d$ are proportionally decreasing.

The above-mentioned influences balance one another out for a distance $d$ corresponding to the point Q.

It may therefore be concluded from the foregoing that, between the points P and Q of the curve, the internal resistance of the chamber 40 decreases in proportion as $d$ increases and passes through a minimum at Q.

From the point Q, the curve bends towards zero.

This bend is governed by the following factors:

(a) The gradual reduction of the electrostatic field between the discs 41 and 42, due to which the paths of the ions are no longer parallel to the field lines.

(b) The recombination of the ions due to the lengthening of their paths and the drifts resulting therefrom.

The recombination of the charge carriers in a gas is greatly favoured by the capture of electrons to form negative ions, since, under the aforesaid conditions ($d$ is very large), the excess of the energy of the electron-positive ion system is very low.

(c) The influence of the neutral gas molecules intervening in the so-called "three body" reaction, which considerably favours the recombination in accordance with the equation

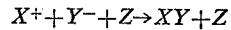

$$X^+ + Y^- + Z \rightarrow XY + Z$$

in which Z is the neutral molecule under consideration.

The presence of Z indicates that the recombination effects resulting from the above action depend upon the pressure and will be more marked in proportion as the pressure is higher.

Moreover, when this same pressure is increased for values of $d$ between the points B and C of the abscissa axis, this is equivalent to increasing the value of the dielectric constant between the plates of the capacitor formed of the discs 41 and 42, and consequently the voltage across the terminals of these same plates will tend to decrease. The last two influences considered, i.e. the three-body effect and the increase of the dielectric constant of the medium, are cumulative, and consequently the internal resistance variations due to the pressure variations will be much greater than those resulting from variations due to the concentration or the chemical nature of the gases in the ambient medium.

Therefore, the two ionisation chambers may be arranged as illustrated in FIGURE 4. The chamber 1 is adjusted to have a high recombination rate as explained in the foregoing. The chamber 2 is, as before, a conventional ionisation chamber of the cylindrical type having a central electrode excited by an ionising source which is more active than that of the chamber 1. The two open chambers are disposed in a common enclosure 46 formed with two windows 47 and 48, of which the horizontal center plane coincides with the center plane of the chambers 1 and 2. The remainder of the circuit is identical to that of FIGURE 1.

Under these conditions, the two chambers are simultaneously subjected to the action of the ambient medium and are also subjected to electromagnetic induction if the enclosure 46 consists of metal and is grounded as illustrated.

Consequently, the response of the chamber 2 (in which the losses due to recombination are limited to a strict minimum) will be much more sensitive to the variations of concentration in the gas mixtures or of the chemical nature of the latter than the chamber 1.

There has therefore been provided a system comprising two ionisation chambers, wherein one of the chambers is simply very sensitive to pressure variations (and to other disturbing agents) exerted on its walls by the gas, while the other is very sensitive both to the variations occurring in the chemical nature of the ambient medium and in the degree of concentration of the latter, and to external physical agents.

By subjecting a field-effect transistor to the action of a potentiometric divider comprising two open ionisation chambers, there is obtained a combination which has equal reliability and sensitivity in all its elements.

It is obvious that the combination of the two open chambers could be employed with any known detector.

The apparatus obtained, however, would exhibit the defects specific to the detector employed, which have been enumerated in the introduction to the description.

If the spacing between the discs of the chamber 1 is so adjusted that the variations of its internal resistance under the influence of pressure, temperature or turbulence are equal to the variations of the internal resistance of the chamber 2 for these same factors, the resultant of this action will be nil and these variations therefore will not affect the potential at the point 4, i.e. will not modify the bias of the field-effect transistor 9.

On the other hand, the small internal resistance variations of the chamber 1 as a function of the chemical nature or of the concentration of the ambient medium will only very slightly affect the voltage set up across the terminals of the chamber 2.

The potential at the point 4, i.e. the potential applied to the control grid 8 of the field-effect transistor 9, will therefore be influenced only by the chemical nature or the concentration of the gaseous medium. It is thus possible with the apparatus described to provide a circuit for the detection of gases, vapours, and fumes which can be absolutely compensated and even to effect an over-compensation, in regard to the undesirable action of external physical agents.

FIGURES 5 and 6 illustrate to a true scale an external view and an internal view, respectively, of a preferred construction of the arrangement of the two ionisation chambers open to the ambient medium.

The two-chamber arrangement is mounted within a casing 46 formed with windows 47 and 48 situated opposite the two chambers and provided with a protective metal grid 49. The lower end 50 of the casing 46 is open to the admission of gases in the same way as the windows 47 and 48. The other end of the casing consists of a support 51 on which the connecting pins are mounted.

The chamber 2 is of the cylindrical type having a central electrode. The cylindrical electrode 60 is formed with holes to permit the entry of gases into the chamber. The central electrode 57 is spherical and is held in position by a nut 59 associated with an insulating washer 56. The assembly 56–57 is maintained by a ring 58.

The chamber 1 consists of two parallel discs 5 and 6 of small dimensions, the distance between which is adjusted for the purpose of providing a chamber having a high recombination rate, as explained in the foregoing, by coaxial displacement of the disc 5 on the screw 52. The locking is effected by means of the locking screw 53. The adjusting device is supported by the uprights 54. The disc 6 is provided with a connecting lug 55 corresponding to the terminal 4 of FIGURE 4. The active load is placed at the center of one of the discs, in the present instance at the center of the disc 5.

The signals supplied by the detecting device may serve, optionally after amplification, to actuate warning systems, of any general type, which may comprise relays. More particularly, these same signals may set in operation telecommunications systems of any general type.

A particularly interesting case is that of the detection of forest fires, in which cables could be destroyed by some action, or again in which the very laying of cables would be too costly or impossible. In such cases, the apparatus according to the invention will be provided with an apparatus emitting coded electromagnetic waves to identify the origin of the signal.

What is claimed is:

1. Apparatus for detecting and measuring signals derived from the ionization of a gaseous medium, comprising a first ionization chamber which is provided with two electrodes and an ionizing source and is open to the ambient medium, a second ionization chamber which is provided with two electrodes and an ionizing source and is electrically connected in series with the said first chamber, said second chamber acting as a reference element, the interior of said second chamber being in direct connection with the ambient medium, the electrodes of said second chamber being spaced apart by a distance greater than the spacing between the electrodes of said first chamber whereby said second chamber operates in the region of its response characteristic where the recombination rate of the gas ions is high such that the variation of the internal resistance of said second chamber depends substantially only on the gas pressure variations, detecting means connected to a junction point between the said two chambers and which is responsive to voltage variations, and an electrical voltage source connected across the said two chambers.

2. Apparatus for detecting and measuring signals according to claim 1, wherein the electrodes of said second chamber consist of two parallel discs of small dimensions relative to those of said first chamber, the said second chamber further comprising means for adjusting the distance between said electrodes by coaxial displacement of one of the discs, said ionizing source of said second chamber being supported by one of said discs and comprising a quantity of radioactive material which is less active than the ionizing source contained in said first chamber.

3. Apparatus for detecting and measuring signals derived from the ionization of a gaseous medium, comprising a first ionization chamber which is provided with two electrodes and an ionizing source and is open to the ambient medium, a second ionization chamber which is provided with two electrodes and an ionizing source and is electrically connected in series with the said first chamber, said second chamber acting as a reference element, the interior of said second chamber being in direct connection with the ambient medium, the electrodes of said second chamber being spaced apart by a distance greater than the spacing between the electrodes of said first chamber, whereby said second chamber operates in the region of its response characteristic where the recombination rate of the gas ions is high such that the variation of the internal resistance of said second chamber depends substantially only on the gas pressure variations, detecting means responsive to voltage variations and having an input impedance of at least $10^{13}$ ohms, the input of said detecting means being connected to a junction point between said two chambers, and an electrical voltage source connected across the said two chambers.

4. Apparatus for detecting and measuring signals according to claim 3, wherein said detecting means comprises a metal-oxide-semiconductor device having source and drain electrodes and a control electrode which is connected to said junction point between the two chambers, and a load in the circuit of one of the source and drain electrodes.

References Cited

UNITED STATES PATENTS

| 2,702,898 | 2/1955 | Meili | 250—86 X |
|---|---|---|---|
| 3,009,098 | 11/1961 | Simons. | |
| 3,304,545 | 2/1967 | Bell et al. | |

RALPH G. NILSON, *Primary Examiner.*

A. B. CROFT, *Assistant Examiner.*

U.S. Cl. X.R.

250—83.6